(12) United States Patent
Fay, II

(10) Patent No.: US 10,568,264 B2
(45) Date of Patent: Feb. 25, 2020

(54) HARVESTER WITH HEADER LIFT ASSEMBLY

(71) Applicant: CNH Industrial America. LLC, New Holland, PA (US)

(72) Inventor: Jeffrey B. Fay, II, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 103 days.

(21) Appl. No.: 15/849,093

(22) Filed: Dec. 20, 2017

(65) Prior Publication Data

US 2019/0183050 A1    Jun. 20, 2019

(51) Int. Cl.

| A01D 41/14 | (2006.01) |
|---|---|
| A01D 34/90 | (2006.01) |
| A01D 34/28 | (2006.01) |
| A01D 75/00 | (2006.01) |
| A01D 57/20 | (2006.01) |

(52) U.S. Cl.
CPC ......... *A01D 41/145* (2013.01); *A01D 34/283* (2013.01); *A01D 34/90* (2013.01); *A01D 41/141* (2013.01); *A01D 75/004* (2013.01); *A01D 57/20* (2013.01); *A01D 2034/907* (2013.01)

(58) Field of Classification Search
CPC .. A01D 41/145; A01D 75/004; A01D 34/283; A01D 41/141; A01D 34/90; A01D 57/20; A01D 2034/907; A01D 41/14; A01D 43/107; A01D 67/00; A01D 67/005; A01D 41/06; A01D 34/662; A01B 59/006; A01B 63/008; A01B 63/108
See application file for complete search history.

(56) References Cited

U.S. PATENT DOCUMENTS

| 2,833,105 | A |   | 5/1958  | Naery     |              |
|-----------|---|---|---------|-----------|--------------|
| 4,124,970 | A | * | 11/1978 | Bernhardt | A01D 41/141  |
|           |   |   |         |           | 56/10.2 E    |
| 4,206,582 | A | * | 6/1980  | Molzahn   | A01D 41/145  |
|           |   |   |         |           | 56/15.8      |
| 4,206,584 | A | * | 6/1980  | Johnson   | A01D 41/14   |
|           |   |   |         |           | 56/15.8      |
| 4,227,363 | A | * | 10/1980 | Kerber    | A01D 41/145  |
|           |   |   |         |           | 56/10.2 E    |
| 4,473,993 | A | * | 10/1984 | Jennings  | A01D 34/28   |
|           |   |   |         |           | 56/192       |
| 4,594,840 | A | * | 6/1986  | D'Almeida | A01D 41/145  |
|           |   |   |         |           | 56/11.2      |
| 4,676,053 | A | * | 6/1987  | Pruitt    | A01D 67/00   |
|           |   |   |         |           | 172/466      |
| 4,724,661 | A | * | 2/1988  | Blakeslee | A01D 43/107  |
|           |   |   |         |           | 56/15.8      |

(Continued)

FOREIGN PATENT DOCUMENTS

WO    2015004165    1/2015

*Primary Examiner* — Arpad Fabian-Kovacs
(74) *Attorney, Agent, or Firm* — Patrick M. Sheldrake; Peter K. Zacharias

(57) ABSTRACT

A header for a harvester includes: a header frame; one or more harvesting elements carried by the header frame; a lift arm coupled to the header frame and configured to displace the header frame vertically relative to the ground; and a lift assembly displaceably coupling the header frame to the lift arm, the lift assembly being configured to displace the header frame vertically further than and/or independently of the lift arm.

20 Claims, 8 Drawing Sheets

(56) References Cited

U.S. PATENT DOCUMENTS

| | | | | |
|---|---|---|---|---|
| 4,733,523 A * | 3/1988 | Dedeyne | A01D 75/287 | |
| | | | 56/10.2 E | |
| 5,046,230 A * | 9/1991 | Hurlburt | A01D 41/145 | |
| | | | 29/426.1 | |
| 5,157,905 A * | 10/1992 | Talbot | A01D 41/14 | |
| | | | 56/15.9 | |
| 5,535,578 A * | 7/1996 | Honey | A01D 41/145 | |
| | | | 56/14.9 | |
| 5,566,536 A * | 10/1996 | Krafka | A01D 43/107 | |
| | | | 56/15.2 | |
| 5,633,452 A * | 5/1997 | Bebernes | A01D 41/145 | |
| | | | 56/10.2 E | |
| 5,778,644 A * | 7/1998 | Keller | A01D 41/142 | |
| | | | 56/11.2 | |
| 5,964,077 A * | 10/1999 | Guinn | A01D 41/14 | |
| | | | 56/10.2 E | |
| 5,983,615 A * | 11/1999 | Schmid | A01D 41/14 | |
| | | | 56/208 | |
| 6,073,431 A * | 6/2000 | Osborne | A01D 41/16 | |
| | | | 56/15.7 | |
| 7,626,908 B2 | 5/2009 | Rice et al. | | |
| 7,918,076 B2 | 4/2011 | Talbot | | |
| 7,950,212 B1 | 5/2011 | Figgins et al. | | |
| 10,292,333 B2 * | 5/2019 | Missotten | A01D 75/185 | |
| 2006/0248868 A1 * | 11/2006 | Otto | A01D 41/141 | |
| | | | 56/10.2 E | |
| 2006/0254234 A1 * | 11/2006 | Bomleny | A01D 41/141 | |
| | | | 56/10.2 E | |
| 2006/0254239 A1 * | 11/2006 | Fackler | A01D 41/145 | |
| | | | 56/15.8 | |
| 2007/0012010 A1 * | 1/2007 | Otto | A01D 41/14 | |
| | | | 56/10.2 R | |
| 2007/0068129 A1 * | 3/2007 | Strosser | A01D 41/141 | |
| | | | 56/10.2 E | |
| 2007/0163220 A1 * | 7/2007 | Ehrhart | A01D 34/283 | |
| | | | 56/10.2 E | |
| 2008/0072560 A1 * | 3/2008 | Talbot | A01D 41/14 | |
| | | | 56/208 | |
| 2011/0047946 A1 * | 3/2011 | Otto | A01D 41/145 | |
| | | | 56/10.2 E | |
| 2013/0125521 A1 * | 5/2013 | Patterson | A01D 43/04 | |
| | | | 56/14.5 | |
| 2015/0271999 A1 * | 10/2015 | Enns | G05B 15/02 | |
| | | | 700/275 | |
| 2016/0128261 A1 * | 5/2016 | Figger | A01B 59/006 | |
| | | | 56/10.1 | |
| 2016/0165799 A1 * | 6/2016 | Missotten | A01D 41/14 | |
| | | | 56/229 | |
| 2016/0183460 A1 * | 6/2016 | Missotten | A01D 41/145 | |
| | | | 56/229 | |
| 2017/0127612 A1 * | 5/2017 | Fay, II | A01D 41/145 | |
| 2018/0153102 A1 * | 6/2018 | Dunn | A01D 41/145 | |

* cited by examiner

HARVESTER WITH HEADER LIFT ASSEMBLY

BACKGROUND

Harvesters such as windrowers, tractors, and forage harvesters, are equipped with headers to harvest crops in a field. A typical header includes a header frame carrying one or more harvesting elements, such as a cutter bar or sickle, that engage and separate the crop material from the field for collection by the harvester. The header also typically includes some type of conveying mechanism, such as a pair of rotating augers or belts, that will convey cut crop material toward a center of the header and rearwardly into the harvester for further processing and/or transport.

To more quickly collect crop material from fields, current design trends have been to make the header of harvesters relatively wide so fewer passes are needed to harvest crop material from an entire field, which can save the user a considerable amount of time. The header is generally the widest part of a harvester; some headers have, for example, operating widths of 40 feet or more. While increasing the width of the header allows for quicker collection of crop material, one particular issue that results from widening the header arises when the header must be transported from one location to another at high speeds, i.e., on public roads. In many instances, the operating width of the header is too large to meet the width restriction requirements necessary to travel on public roads.

To overcome the problem of the operating width of the header being too wide to travel on public roads, headers have been developed including multiple transport wheels that can be deployed from the header. Before deploying the transport wheels, the header must be lifted to a sufficient height that allows the transport wheels to fold out of their stored position into the deployed position. Upon the transport wheels being deployed, the header can be pulled along a travel axis that extends through the width of the header, i.e., the width of the header becomes the travel length of the header, allowing the header to be pulled by another vehicle on public roads while staying within the legal width restrictions.

SUMMARY

The present disclosure relates to a lift assembly for a header of a harvester that displaceably couples a lift arm to a header frame of the header and is configured to displace the header frame vertically further than and/or independently of the lift arm.

In some exemplary embodiments disclosed herein, a header for a harvester includes: a header frame; one or more harvesting elements carried by the header frame; a lift arm coupled to the header frame and configured to displace the header frame vertically relative to the ground; and a lift assembly displaceably coupling the header frame to the lift arm, the lift assembly being configured to displace the header frame vertically further than and/or independently of the lift arm.

In some exemplary embodiments disclosed herein, a harvester includes a harvester frame and a header carried by the harvester frame. The header includes: a header frame; one or more harvesting elements carried by the header frame; a lift arm coupled to the header frame and configured to displace the header frame vertically relative to the ground; and a lift assembly displaceably coupling the header frame to the lift arm, the lift assembly being configured to displace the header frame vertically further than and/or independently of the lift arm.

In some exemplary embodiments disclosed herein, a method of adjusting a header of a harvester is provided. The header includes a header frame carrying one or more harvesting elements, a lift arm coupled to the header frame, and a lift assembly displaceably coupling the lift arm to the header frame. The method includes: moving the lift arm vertically relative to the ground so as to raise the lift assembly and coupled header frame; and applying a force to the lift assembly to vertically raise the header frame relative to the ground beyond a maximum vertical position achievable by movement of the lift arm alone.

One possible benefit that may be realized by exemplary embodiments disclosed herein is that the lift assembly may be retrofitted to headers in order to provide additional lift needed to deploy transport wheels.

Another possible benefit that may be realized by exemplary embodiments disclosed herein is the lift assembly is relatively easy to install on a header.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed harvester and header, reference is made to the accompanying figures, wherein.

DETAILED DESCRIPTION

Figure 1:
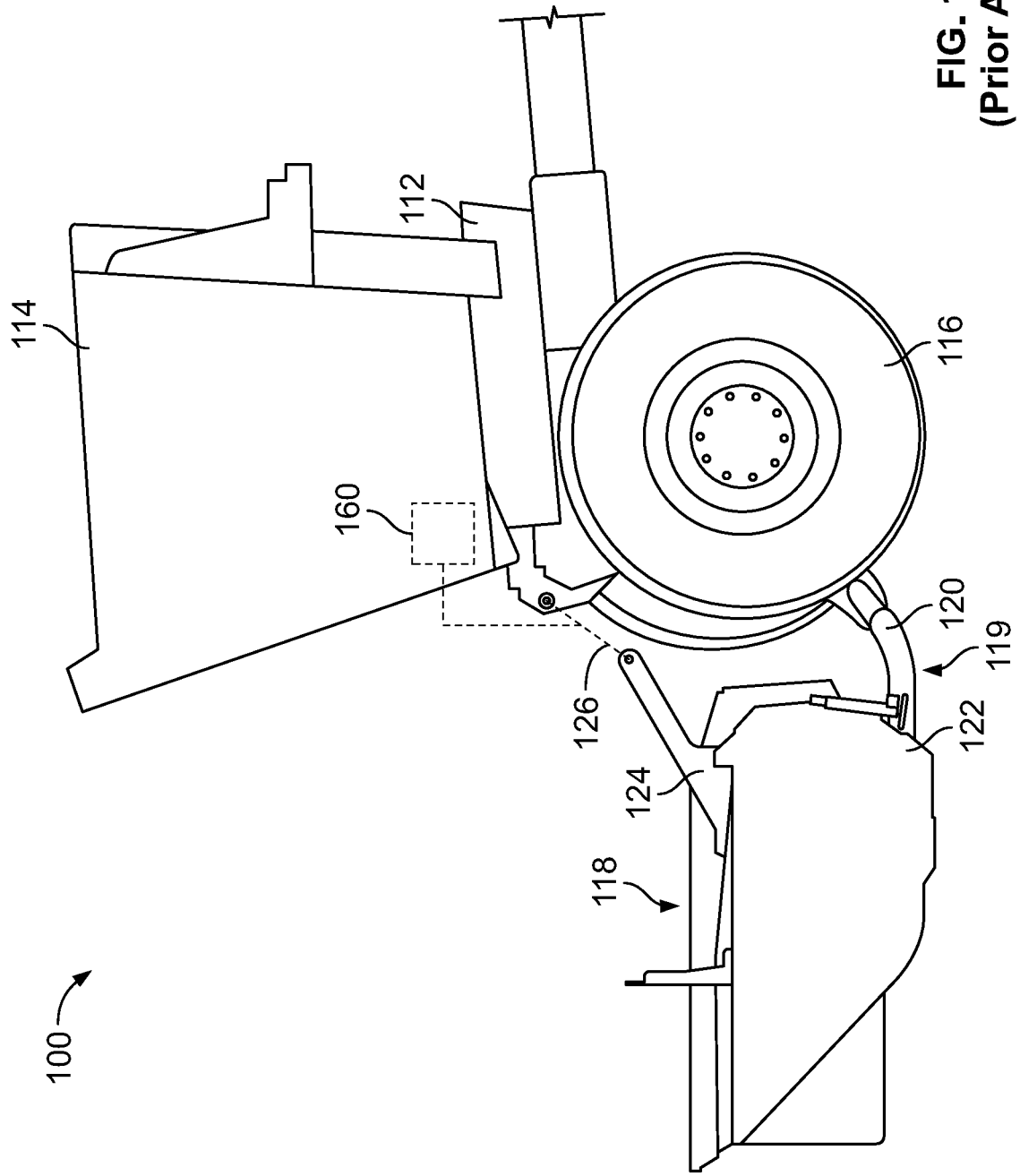
FIG. 1 is a side view of a known windrower.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "plurality" as used herein is defined as any amount or number greater or more than 1. In some embodiments, the term "plurality" means 2, 3, 4, 5, 6 or more.

The terms "left" or "right" are used herein as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes.

The term "harvester" as used herein is defined as a machine that consolidates and/or packages material so as to facilitate the storage and handling of the material for later use. In some embodiments, the harvester is used to harvest agricultural material. In some embodiments, the harvester is a windrower, a forage harvester, or a combine harvester. In some embodiments, the harvester is a self-propelled windrower.

The term "material" as used herein is defined as a numerous individual items that are harvested or collected by the harvester. In some embodiments, the material is agricultural crop, such as hay or silage. In some embodiments, the material is biomass.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Windrowers and tractors, such as self-propelled windrowers, are well known in the agricultural industry, and the exemplary embodiments disclosed herein can be used with substantially any of such machines. Reference is made, for example, to U.S. Pat. Nos. 9,101,090 and 8,020,648; that illustrate such windrowers, the disclosures of which are incorporated herein by reference in their entireties. Embodiments disclosed herein are particularly well suited, but in no way limited to, use with windrowers. Exemplary embodiments disclosed herein may also find utility in agricultural harvesters including, for example, a self-propelled windrower, a forage harvester, and a combine harvester.

Figure 2:
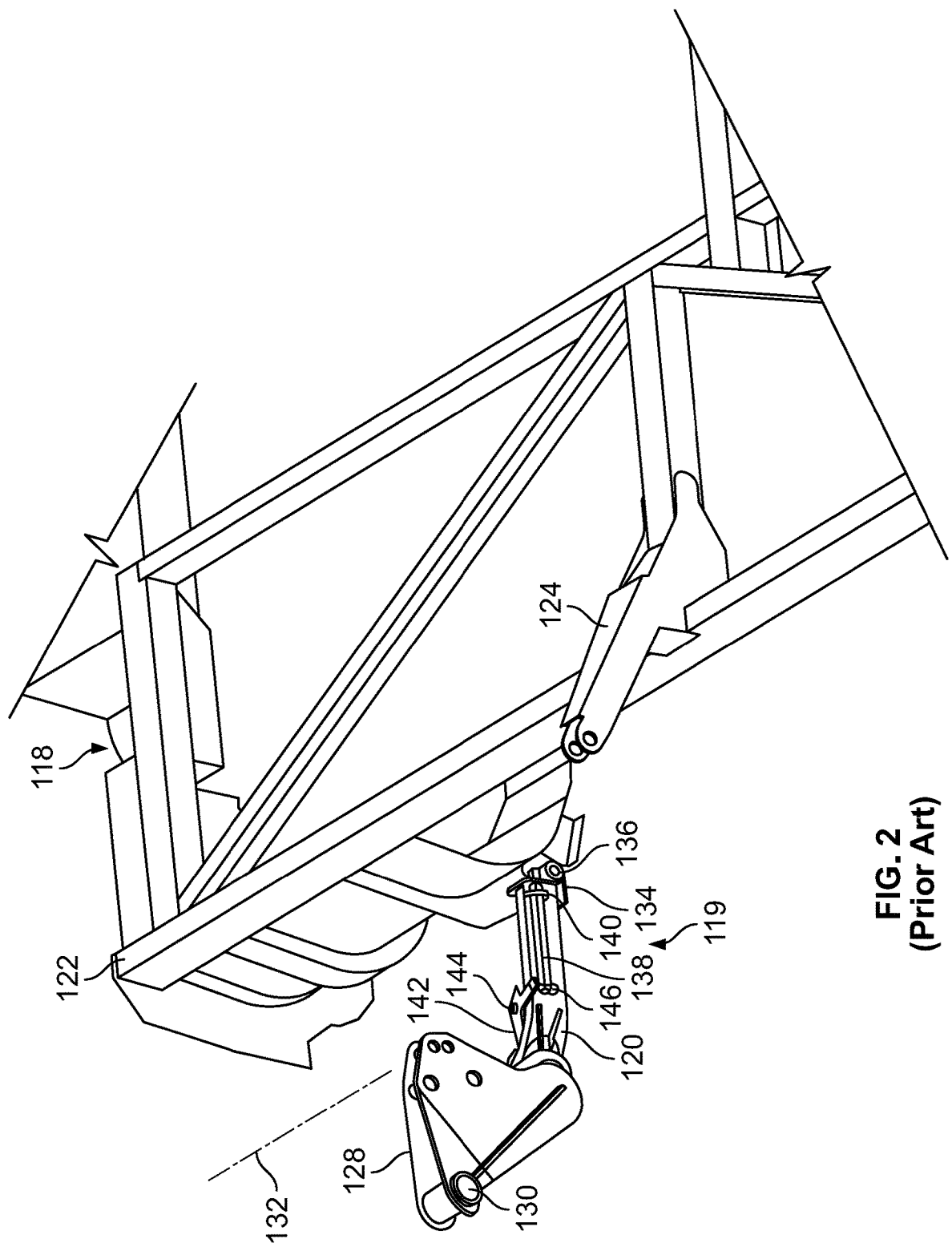
FIG. 2 is a perspective view of a lift system of the windrower shown in FIG. 1.

Referring now to the drawings, and more particularly to FIGS. 1 and 2, a side view of a harvester 100 known from U.S. Patent Application Publication No. 2017/0150674 to Sudbrack et al., which is incorporated by reference in its entirety, is shown. The harvester 100 includes a harvester frame 112 carrying an operator cab 114, at least one drive wheel 116, and a removable header 118. The harvester 100 may also include other components to effect operation of the harvester 100, such as a power plant to provide power to the components of the harvester 100, but these components are omitted from view for brevity of description.

As can be seen, the header 118 is attached to the harvester frame 112 by a connection system 119 including cooperating components on both the harvester 100 and the header 118. The header 118 is supported at its bottom edge by lift arms 120 secured to and operable at the forward portion of agricultural harvester 100. Header 118 has a header frame 122 and a central arm 124, which connects to an actuator 126 shown as a dashed line extending to harvester frame 112. Referring particularly to FIG. 2, each lift arm 120 is connected to a plate 128 that is pivotally mounted to harvester 100 at pivotal connection 130 and is connected to an arm actuator 132, shown as a dashed line, to pivot plate 128 and lift arm 120 about pivot point 130. Lift arm 120 has an upwardly facing U-shaped recess or cup 134 at the distal end which receives a lift pin 136 secured to the rearward face of header frame 122. The upwardly facing U-shaped recess 134 enables header 118 to be connected to and disconnected from agricultural harvester 100 via the engagement and disengagement of lift pin 136 in cup 134.

In order for the header 118 to be locked in place when attached to harvester 100, a bar 138 is mounted adjacent lift arm 120 and extends through an opening 140 to capture lift pin 136 when the bar 138 is in its forward position. Bar 138 is actuated by a lever arm 142 pivotally secured to the lift arm 120 at an axis 144 which is vertical so that the lever arm 142 pivots in a horizontal plane. Lever arm 142 is connected pivotally to bar 138 at a pivotal connection 146.

To deploy transport wheels from the header 118 for transport, the lift arm 120 can lift the header 118 to a transport position that allows deployment of the transport wheels and disconnection of the header 118 from the harvester 100. Often times, the transport wheels are retro-fitted to headers as part of a transport system kit. It has been found that, following some transport wheel retrofits, the existing header lift system of the harvester may not be able to adequately lift the header in certain situations, preventing the transport wheels from deploying properly. Inadequate lifting of the header lift system requires additional lift being provided to the header by an external source before deploying the transport wheels, which is inconvenient for the user. Further, entirely replacing the header lift system of the harvester is prohibitively time-consuming and/or expensive for many users.

Figure 3:
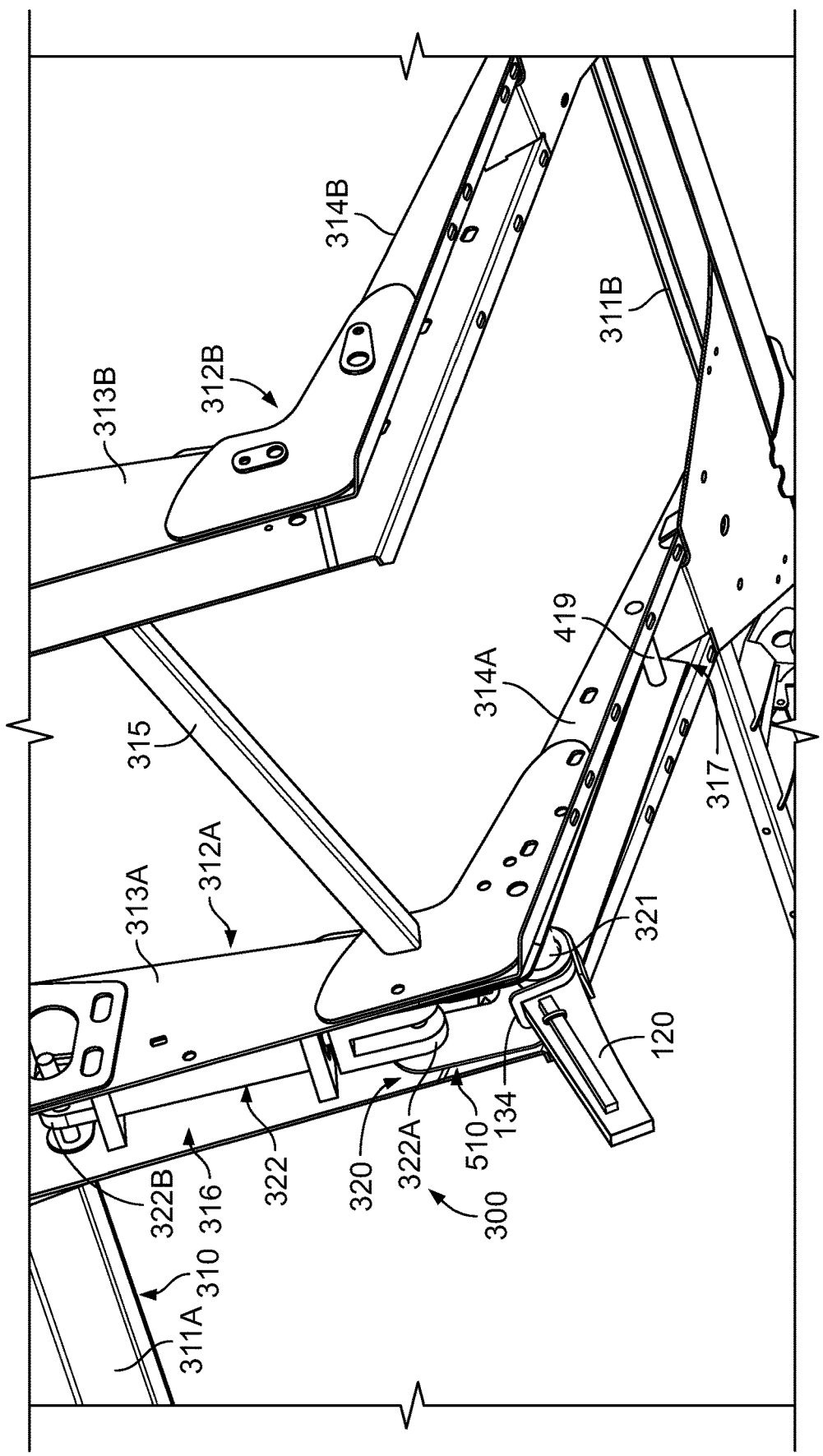
FIG. 3 is a perspective view of an exemplary embodiment of a lift assembly incorporated in a header, the lift assembly being shown in an operating orientation.
Figure 4:
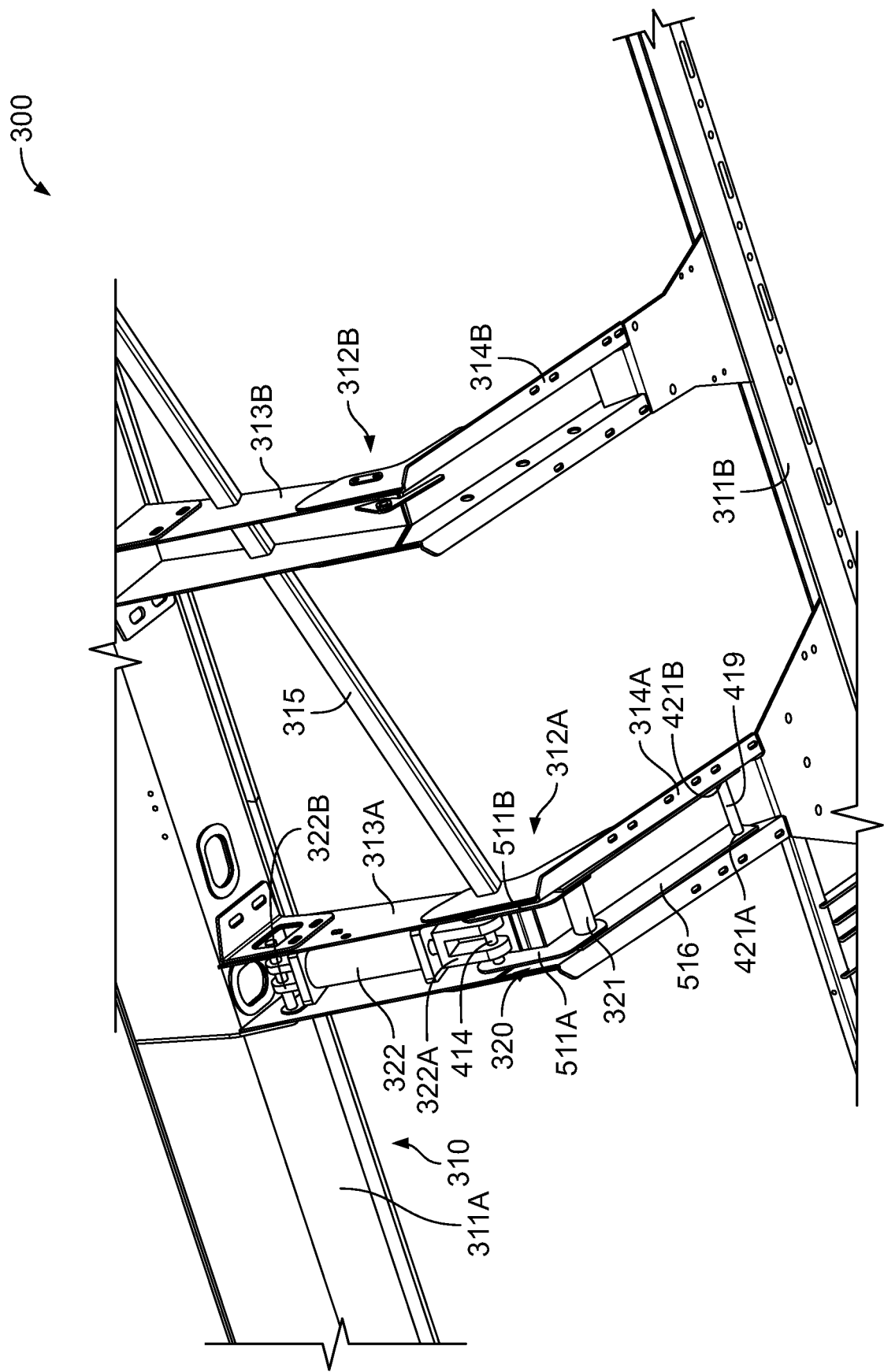
FIG. 4 is another perspective view of the header and lift assembly shown in FIG. 3, with the lilt arm removed from view.

Referring now to FIGS. 3-4, an exemplary embodiment of a modified header 300 is shown. The header 300 may be utilized in place of previously described removable header 118 in the harvester 100. As can be seen, the header 300 includes a header frame 310 that carries at least one harvesting element 710 (shown in FIG. 7) and is displaceably coupled to the lift arm 120 by a lift assembly 320. As used herein, a "harvesting element" can be any type of element carried by the header frame 310 that may be used to remove or otherwise harvest crop material from a field. Exemplary harvesting elements may include, but are not limited to, knives, sickles, beaters, cutter bars, etc. that may, but do not necessarily, reciprocate, rotate, or otherwise move to engage crops in a field in a manner that allows for removal of the crop material from the field. Many such harvesting elements are known, so further discussion is omitted for brevity.

The header frame 310 may include a plurality of horizontally extending frame beams 311A, 311B connected to one another by one or more connecting strut assemblies 312A, 312B. Each connecting strut assembly 312A, 312B may include a respective vertically extending strut 313A, 313B connected to the horizontal beam 311A and a respective forwardly extending strut 314A, 314B connected to the horizontal beam 311B so the horizontal beam 311B can be held below and forwardly of the horizontal beam 311A, which is best shown in FIG. 4. The header frame 310 may also include one or more cross beams 315 connecting the strut assemblies 312A, 312B to, for example, the horizontal beam 311A. It should be appreciated that the exemplary embodiment of the header frame 310 described herein may be altered by, for example, changing the number, location, angling, and other parameters of the beams forming the header frame 310.

The lift assembly 320, as shown, displaceably couples the header frame 310 to the lift arm 120 and is configured so the lift assembly 320 can displace the header frame 310 vertically further than and/or independently of the lift arm 120. In this sense, the lift assembly 320 can allow for further vertical displacement of the header frame 310 after, for example, the lift arm 120 has raised the header frame 310 to a maximum vertical position achievable by movement of the lift arm 120 alone. To achieve further and/or independent displacement of the header frame 310, the lift assembly 320 can include a lift pin 321 that is coupled to the header frame 310 and an actuator 322 that is coupled to the lift pin 321 and the header frame 310. As shown in FIG. 3, the lift pin 321 can be captured in the cup 134 of the lift arm 120 so that vertical displacement of the lift arm 120 causes a corresponding vertical displacement of the lift pin 321 and, by virtue of connection, the header frame 310, In the orientation shown in FIGS. 3-4, which may be referred to as an "operating orientation," the lift assembly 320 may be substantially housed within respective spaces 316, 317 defined between sidewalls of the struts 313A, 314A. By housing the lift assembly 320 in spaces 316, 317 defined between sidewalls of the struts 313A, 314A, exposure of the lift assembly 320 to potentially damaging particles during harvesting can be reduced by having the struts 313A, 314A shield the lift assembly 320.

In one exemplary embodiment, the actuator 322 may be a hydraulic, pneumatic, or electric actuator that is connected at one end 322A to the lift pin 321 and at an opposite end 322B to the header frame 310 by connection to the vertically extending strut 313A. When the actuator 322 is a hydraulic or pneumatic actuator, the actuator 322 may be supplied with fluid by, for example, a fluid connection with the fluid circuit (not shown) that supplies fluid to the actuator 132 coupled to the lift arm 120. Selective activation of the actuator 322 may then be controlled by, for example, selectively opening and closing one or more valves (not shown) between the fluid circuit and the actuator 322. Many suitable techniques for selectively activating individual actuators connected to a common fluid circuit are known, so further discussion is omitted for brevity.

Figure 5:
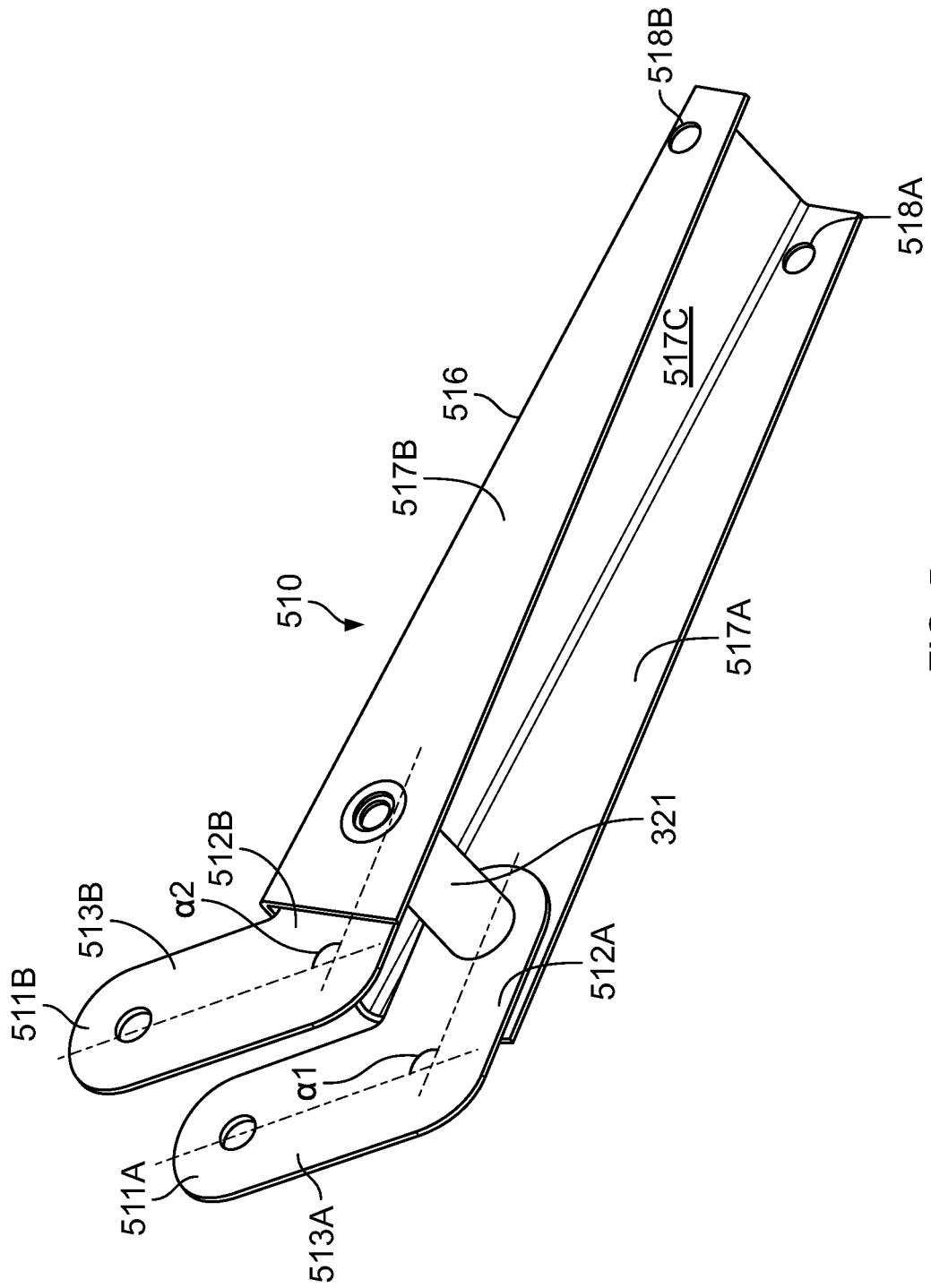
FIG. 5 is a perspective view of a portion of the lift assembly shown in FIGS. 3-4.

With further reference to FIGS. 3-4, and also referring now to FIG. 5, an exemplary embodiment of a lift pin assembly 510 including the lift pin 321 is shown. The lift pin assembly 510, as shown, can include a pair of coupling yoke plates 511A, 511B that are each connected to the lift pin 321. Each yoke plate 511A, 511B can include a respective first yoke portion 512A, 512B extending rearwardly from and capturing the lift pin 321 and a respective second yoke portion 513A, 513B extending from the corresponding first yoke portion 512A, 512B and connecting to the end 322A of the actuator 322 by, for example, capturing an actuation pin 414 (best seen in FIG. 4) of the actuator 322. In this sense, the yoke plates 511A, 511B couple the lift pin 321 to the actuator 322. As shown, the second yoke portions 513A, 513B may extend at non-perpendicular angles α1, α2 from the first yoke portions 512A, 512B, which will be described further herein.

The lift pin assembly 510 can also include a lift lever 516 pivotally coupling the header frame 310 to the lift pin 321. The lift lever 516 may, in one exemplary embodiment, include a pair of side surfaces 517A, 517B each having a respective opening 518A, 518B formed therein that hold a header pin 419 extending through the openings 518A, 518B of the lift lever 516 and header frame openings 421A, 421B formed in the forwardly extending strut 314A. A top surface 517C of the lift lever 516, on the other hand, may be free from the header frame 310 to allow pivotal movement of the header frame 310 relative to the lift pin 321, as will be described further herein, and may also abut against the forwardly extending strut 314A when the lift assembly 320 is in the operating position as shown in FIGS. 3-4. In some exemplary embodiments, the header pin 419 may define a pivot point of the header frame 310, as will be described further herein. As can be seen, the yoke plates 511A, 511B can be held between the side surfaces 517A, 517B of the lift lever 516, with the side surfaces 517A, 517B preventing the yoke plates 511A, 511B from slipping off of the lift pin 321 during operation.

As shown in FIGS. 3-4, the lift arm 120 has been moved vertically relative to the ground so as to raise the lift assembly 320 and the header frame 310 to a maximum vertical position achievable my movement of the lift arm 120 alone, i.e., the lift arm 120 cannot generally be moved to raise the header 300 any further, relative to the ground. In some cases, the header 300 is not raised sufficiently by movement of the lift arm 120 alone to, for example, deploy one or more transport wheels 730 (shown in FIG. 7) and prepare the header 300 for transport. In such cases, additional lift is needed to deploy the transport wheel(s) 730.

Figure 6:
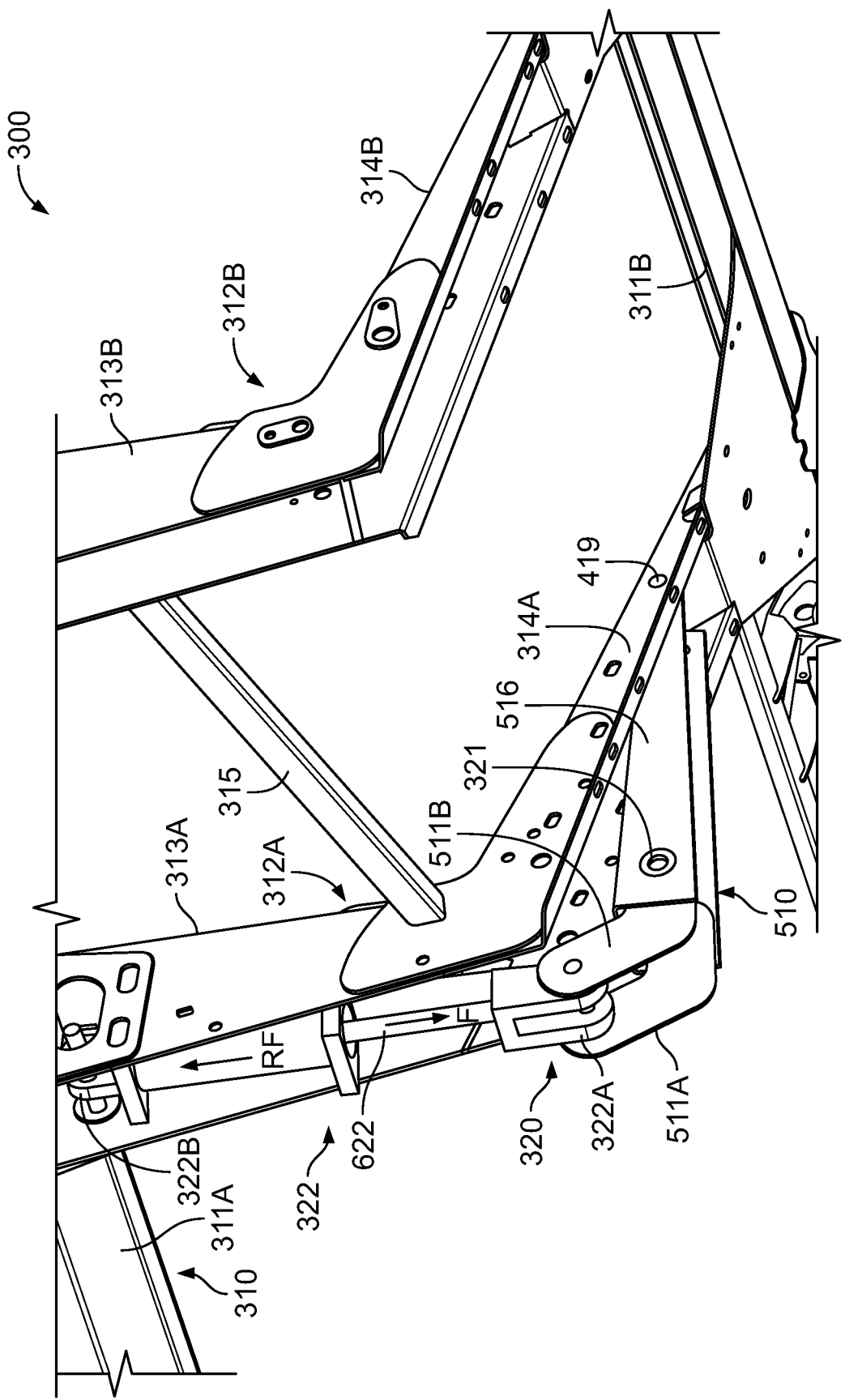
FIG. 6 is a perspective view of the header shown in FIGS. 3-4 when the lift assembly has been activated to further raise the header.
Figure 7:
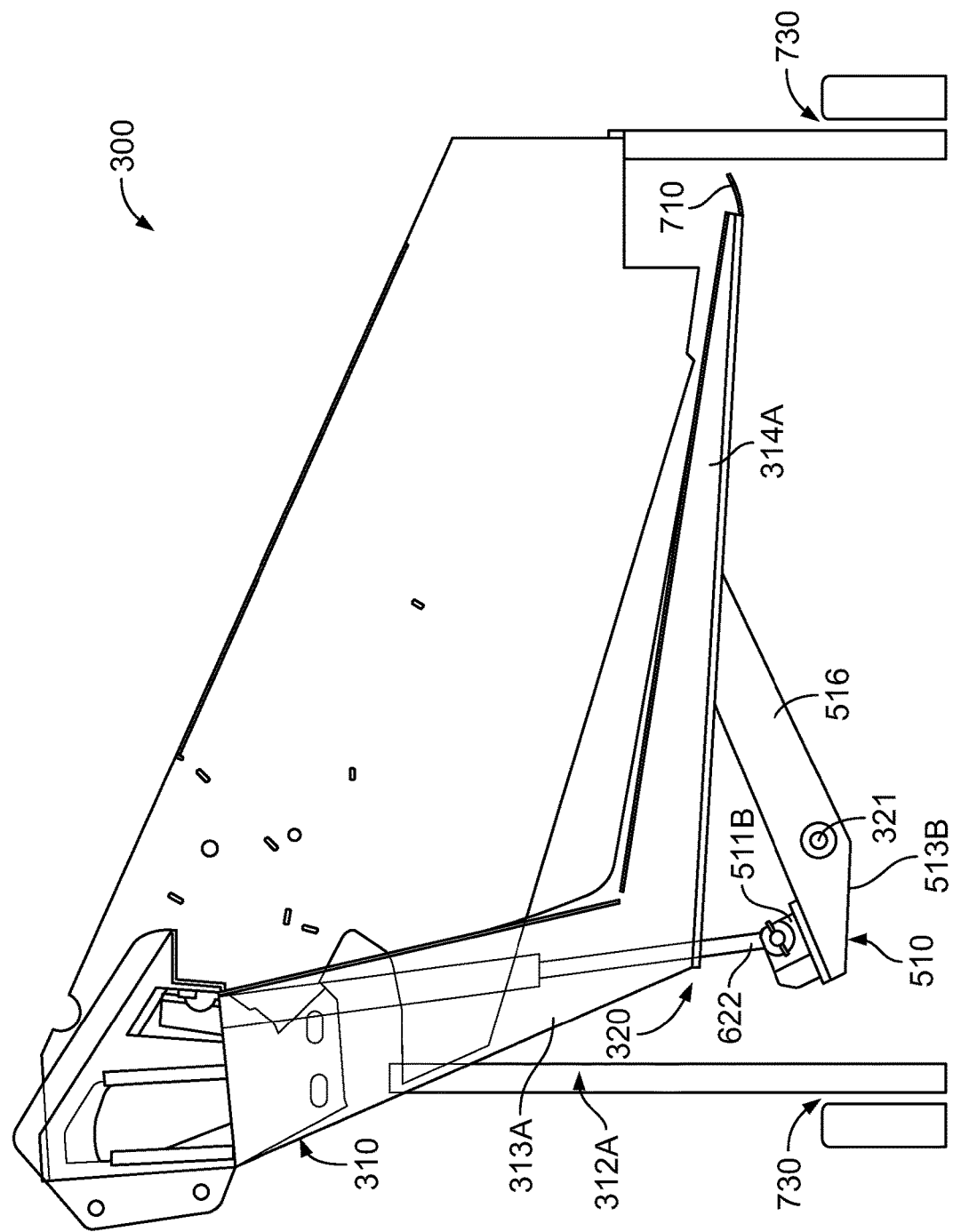
FIG. 7 is a side view of the header shown in FIGS. 3-4 and 6 in a maximum lift position.

Referring now to FIGS. 6-7, the header 300 is shown during and after vertical displacement of the header frame 310 independently of and further than the lift arm 120. As can be seen, the actuator 322 has been activated to extend an actuator rod 622 coupled to the yoke plates 511A, 511B of the lift pin assembly 510 to apply a force F to the lift pin assembly 510. It should be appreciated that, even though the lift pin 321 is shown disconnected from the lift arm 120 in FIGS. 6-7 for ease of illustration, the lift pin 321 is captured in the cup 134 of the lift arm 120 during the sequence shown in FIGS. 6-7. Since the lift pin 321 is captured by the cup 134 of the lift arm 120 as the actuator 322 applies the force F to the lift pin assembly 510, the force F applied to the lift pin 321 tends to vertically upwardly displace the header frame 310 due to a reactionary force RF produced as a result of the lift pin 321 being statically held by the lift arm 120. Since the header frame 310 is pivotally coupled to the lift pin 321 by the lift lever 516 and the header pin 419, which defines a pivot point between the lift pin 321 and the header frame 310, the reactionary force RF produced causes the header frame 310 to pivot, relative to the lift pin 321, upward and raise the header frame 310 further than would be possible by just moving the lift arm 120. The force F applied by the actuator 322, which can couple to the lift pin 321 rearwardly of the header pin 419, thus acts as a jacking force on the header frame 310. If the lift pin 321 were rigidly held by the header frame 310, as many known lift pins are, such vertical displacement would not be possible because the lift pin would be, for all intents and purposes, statically held within the header frame, i.e., the header frame would be unable to pivot relative to the lift pin. However, because the header frame 310 is pivotably coupled to the lift pin 321 by the lift lever 516, the force F produced by the actuator 322 causes the reactionary force RF, which then causes pivoting and effective vertically upward displacement of the header frame 310. In some exemplary embodiments, the relative directions of the force F and reactionary force RF may be reversed, i.e., the force F may be directed toward the horizontal beam 311A and the reactionary force RF may be directed toward the ground, with the overall effect on the header frame 310 being substantially the same.

Referring specifically now to FIG. 7, the header 300 is shown with the header frame 310 raised to a deployment position, which allows transport wheels 730 to unfold and deploy from the header 300 in order to contact the ground and support the header 300. As can be seen, second yoke portions 513A, 513B of the yoke plates 511A, 511B can he substantially parallel with the ground in the deployment position to abut against the lift arm 120; it should be appreciated that this orientation of the yoke plates 511A, 511B is optional, and the angles α1, α2 formed between the portions 512A, 513A, 512B, 513B of the yoke plates 511A, 511B can be adjusted to control the final orientation of the respective yoke plates 511A, 511B. Once the transport wheels 730 have been deployed and support the header 300 on the ground, the header 300 can be disengaged from the harvester 100, if desired, and pulled by a separate vehicle, as is known. It should therefore be appreciated that exemplary embodiments of lift assemblies 320 disclosed herein can allow for displacement of a header frame 310 vertically further than and/or independently of a lift arm 120 that can also vertically displace the header frame 310.

While only one lift assembly 320 is illustrated and described herein, the header 300 may include a plurality of lift assemblies 320 each displaceably coupling the header frame 310 to a respective lift arm 120. In one exemplary embodiment, the header 300 may include two lift assemblies 320 that each displaceably couple a respective lift arm 120 to the header frame 310, with each of the lift arms 120 being on an opposite lateral side of the central arm 124. In this sense, each of the lift assemblies 320 can act to provide independent and/or additional lift to a respective lateral side of the header frame 310 so the header frame 310 raises evenly relative to the ground. It should be appreciated, therefore, that exemplary embodiments disclosed herein may include two or more lift assemblies 320 displaceably coupling a respective lift arm to the header frame 310.

Figure 8:
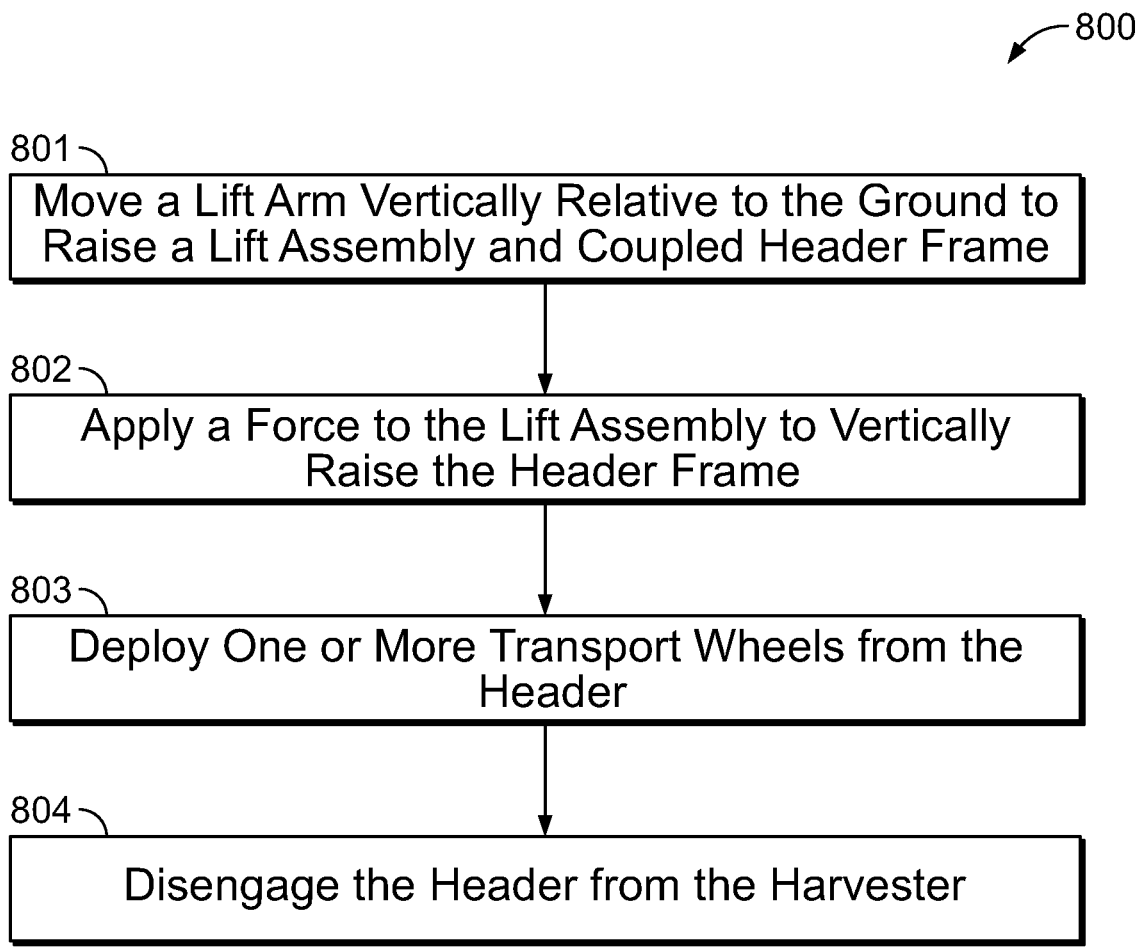
FIG. 8 is a flow chart illustrating an exemplary embodiment of a method of adjusting a header of a harvester.

Referring now to FIG. 8, an exemplary embodiment of a method 800 of adjusting a header 300 of a harvester 100 is illustrated as a flow chart. The header 300 includes a header frame 310 carrying at least one harvesting element 710, a lift arm 120 coupled to the header frame 310, and a lift assembly 320 displaceably coupling the lift arm 120 to the header frame 310. The method 800 includes moving 801 the lift arm 120 vertically relative to the ground so as to raise the lift assembly 320 and coupled header frame 310. The method 800 further includes applying 802 a force F to the lift assembly 320 to vertically raise the header frame 310 relative to the ground beyond a maximum vertical position achievable by movement of the lift arm 120 alone, as shown by comparing FIGS. 3-4 and 7. In some exemplary embodiments, applying 802 the force F may occur simultaneously with moving 801 the lift arm 120; in other exemplary embodiments, applying 802 the force F may occur before or after moving 801 the lift arm 120 such as, in some exemplary embodiments, applying 802 the force F after the header frame 310 has reached the maximum vertical position achievable by movement of the lift arm 120 alone. In some exemplary embodiments, applying 802 the force F to vertically raise the header frame 310 relative to the ground does not substantially vertically move the lift arm 120 relative to the ground, i.e., there is little, if any, appreciable movement of the lift arm 120 caused by applying 802 the force F to the lift assembly 320. In some exemplary embodiments, the method 800 may further include deploying 803 one or more transport wheels 730 from the header 300 to support the header 300 on the ground; in some exemplary embodiments, deploying 803 the transport wheel(s) 730 occurs after applying 802 the force F to the lift assembly 320. In other exemplary embodiments, the method 800 may further include disengaging 804 the supported header 300 from the harvester 100 by, for example, disconnecting the lift arm 120 from the lift pin 321, allowing the header 300 to be pulled by a different vehicle.

In some exemplary embodiments, some or all aspects of the method 800 may be performed by a controller 160 (shown in FIG. 1) carried by the harvester 100. The controller 160 may be operatively connected to the actuators 126, 132, 322 described herein and be programmed to selectively control each of the respective actuators 126, 132, 322 to effect the method 800 described herein. In some exemplary embodiments, the controller 160 may be pre-loaded with code, in the form of software, which allows a user to interact with an input device (not shown) in the operator cab 114 to initiate automatic performance of the method 800. However, it should be appreciated that the method 800 described herein may be manually performed by a user, with or without the assistance of a controller, and exemplary embodiments of the method 800 should not be limited to implementation in a controller or equivalent device.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure. Any public disclosures, patent applications, journal articles or other disclosures identified or cited in this application are incorporated by reference in their entireties.

The invention claimed is:

1. A header for a harvester, comprising:
   a header frame;
   at least one harvesting element carried by the header frame;
   a lift arm coupled to the header frame and configured to displace the header frame vertically relative to the ground; and
   a lift assembly displaceably coupling the header frame to the lift arm, the lift assembly being configured to displace the header frame at least one of vertically further than and independently of the lift arm.

2. The header of claim 1, wherein the lift assembly comprises an actuator coupled to the header frame and a lift pin coupled to the actuator and the header frame.

3. The header of claim 2, wherein the header frame is pivotally coupled to the lift pin.

4. The header of claim 3, wherein the lift assembly further comprises a lift lever pivotally coupling the header frame to the lift pin.

5. The header of claim 3, wherein the lift arm comprises a cup capturing the lift pin.

6. The header of claim 5, wherein the lift pin pivotally couples to the header frame at a pivot point and the actuator couples to the lift pin rearwardly of the pivot point.

7. A harvester, comprising:
   a harvester frame; and
   a header carried by the harvester frame, the header comprising:
   a header frame;
   at least one harvesting element carried by the header frame;
   a lift arm movably coupled to the harvester frame and coupled to the header frame, the lift arm being configured to displace the header frame vertically relative to the ground; and a lift assembly displaceably coupling the header frame to the lift arm, the lift assembly being configured to displace the header frame at least one of vertically further than and independently of the lift arm.

8. The harvester of claim 7, wherein the lift assembly comprises an actuator coupled to the header frame and a lift pin coupled to the actuator and the header frame.

9. The harvester of claim 8, wherein the header frame is pivotally coupled to the lift pin.

10. The harvester of claim 9, wherein the lift assembly further comprises a lift lever pivotally coupling the header frame to the lift pin.

11. The harvester of claim 9, wherein the lift arm comprises a cup capturing the lift pin.

12. The harvester of claim 11, wherein the lift pin pivotally couples to the header frame at a pivot point and the actuator couples to the lift pin rearwardly of the pivot point.

13. The harvester of claim 7, further comprising an arm actuator coupled to the lift arm, the arm actuator being configured to selectively activate and raise the lift arm and lift assembly.

14. A method of adjusting a header of a harvester, the header including a header frame carrying at least one harvesting element, a lift arm coupled to the header frame, and a lift assembly displaceably coupling the lift arm to the header frame, the method comprising:
   moving the lift arm vertically relative to the ground so as to raise the lift assembly and coupled header frame; and
   applying a force to the lift assembly to vertically raise the header frame relative to the ground beyond a maximum vertical position achievable by movement of the lift arm alone.

15. The method of claim 14, wherein the applied force vertically raises the header frame relative to the ground without substantially vertically moving the lift arm relative to the ground.

16. The method of claim 14, wherein the lift assembly comprises a lift pin coupled to the header frame.

17. The method of claim 16, wherein the header frame is pivotally coupled to the lift pin.

18. The method of claim 17, wherein the lift assembly further comprises a lift lever pivotally coupling the header frame to the lift pin.

19. The method of claim 17, further comprising deploying a transport wheel to support the header on the ground after applying the force.

20. The method of claim 19, further comprising disengaging the supported header from the harvester.

* * * * *